(12) United States Patent
Deller et al.

(10) Patent No.: US 6,559,757 B1
(45) Date of Patent: May 6, 2003

(54) DATA COMMUNICATION OVER POWER LINES

(75) Inventors: Robert W. Deller, Santa Clarita, CA (US); Robert C. Heagey, Acton, CA (US)

(73) Assignee: Home Tough Lighting Systems LLC, Salt Lake City, UT (US)

( * ) Notice: Subject to any disclaimer, the term of this patent is extended or adjusted under 35 U.S.C. 154(b) by 0 days.

(21) Appl. No.: 09/697,066

(22) Filed: Oct. 26, 2000

(51) Int. Cl.$^7$ ................................................. H04B 1/00
(52) U.S. Cl. ............................ 340/310.01; 340/310.02; 340/310.03; 375/259
(58) Field of Search ....................... 340/310.01–310.06; 375/259, 261

(56) References Cited

U.S. PATENT DOCUMENTS 4,106,007 A * 8/1978 Johnston et al. ........ 340/310.02
5,198,796 A * 3/1993 Hessling, Jr. .......... 340/310.02
5,404,127 A * 4/1995 Lee et al. .............. 340/310.02

* cited by examiner

*Primary Examiner*—Donnie L. Crosland
(74) *Attorney, Agent, or Firm*—Fulbright & Jaworski L.L.P.

(57) ABSTRACT

A power line communication system includes a field-programmable gate array (FPGA) having a sine wave approximator driven by a high frequency clock in the FPGA. The sine wave approximator generates a high frequency sine wave-shaped communication signal on command by a processor. The data transmission scheme includes sending a sequence of fixed length and fixed frequency cells wherein each transmitted cell is of one of four phases 0°, 90°, 180° or 270° (FIG. 2) relative to the phase of a preceding transmitted cell with the first transmitted cell designated as a zero-phase reference cell. The data transmissions are synchronized by the voltage zero crossings of the AC power line and each transmission consists of 27 cells evenly distributed over the AC voltage line half cycle. The high frequency sine wave-shaped communication signal is superimposed on the low frequency (60 Hz) AC power line via a transconductance amplifier which draws current from the AC power line via a full-wave bridge rectifier. The resulting signal is passed through several stages of filtering and then quantized by a digitizing comparator. The quantized output is a 1-bit in phase or 90 degree out of phase signal which is fed to a demodulator unit within the FPGA. The demodulator unit includes a quadrature generator and two digital integrators for detecting the phase of the incoming signal. The demodulated signal is sent back to the processor for communication data recognition.

13 Claims, 9 Drawing Sheets

| Transmitted Data Format: | | | |
|---|---|---|---|
| Bit # | CELL # | Information | |
| 0 | 0 | Reference 0 | |
| 1 | | Reference 0 | |
| 2 | 1 | Bit H3 - msb House | |
| 3 | | Bit H2 | |
| 4 | 2 | Bit H1 | |
| 5 | | Bit H0 - lsb House | |
| 6 | 3 | Bit A5 - msb Action | |
| 7 | | Bit A4 | |
| 8 | 4 | Bit A3 | |
| 9 | | Bit A2 | |
| 10 | 5 | Bit A1 | |
| 11 | | Bit A0 - lsb Action | Data 1 |
| 12 | 6 | Bit ST7 - msb Station | |
| 13 | | Bit ST6 | |
| 14 | 7 | Bit ST5 | |
| 15 | | Bit ST4 | |
| 16 | 8 | Bit ST3 | |
| 17 | | Bit ST2 | |
| 18 | 9 | Bit ST1 | |
| 19 | | Bit ST0 - lsb Station | |
| 20 | 10 | Bit SW2 - msb Switch | |
| 21 | | Bit SW1 | |
| 22 | 11 | Bit SW0 - lsb Switch | |
| 23 | | Bit CS4 - msb Checksum | |
| 24 | 12 | Bit CS3 | |
| 25 | | Bit CS2 | Checksum 1 |
| 26 | 13 | Bit CS1 | |
| 27 | | Bit CS0 - lsb Checksum | |

(Word 1 spans Data 1 and Checksum 1)

FIG. 5A

| Transmitted Data Format: | | | |
|---|---|---|---|
| Bit # | CELL # | Information | |
| 28 | 14 | Bit H3 - msb House | Data 2 / Word 2 |
| 29 | | Bit H2 | |
| 30 | 15 | Bit H1 | |
| 31 | | Bit H0 - lsb House | |
| 32 | 16 | Bit A5 - msb Action | |
| 33 | | Bit A4 | |
| 34 | 17 | Bit A3 | |
| 35 | | Bit A2 | |
| 36 | 18 | Bit A1 | |
| 37 | | Bit A0 - lsb Action | |
| 38 | 19 | Bit ST7 - msb Station | |
| 39 | | Bit ST6 | |
| 40 | 20 | Bit ST5 | |
| 41 | | Bit ST4 | |
| 42 | 21 | Bit ST3 | |
| 43 | | Bit ST2 | |
| 44 | 22 | Bit ST1 | |
| 45 | | Bit ST0 - lsb Station | |
| 46 | 23 | Bit SW2 - msb Switch | |
| 47 | | Bit SW1 | |
| 48 | 24 | Bit SW0 - lsb Switch | |
| 49 | | Bit CS4 - msb Checksum | Checksum 2 |
| 50 | 25 | Bit CS3 | |
| 51 | | Bit CS2 | |
| 52 | 26 | Bit CS1 | |
| 53 | | Bit CS0 - lsb Checksum | |

*FIG. 5B*

| Gray Encoding: | | | |
|---|---|---|---|
| Input Bit Pair | Output Bit Pair | CELL In | CELL Out |
| 00 | 00 | 0 | 0 |
| 01 | 01 | 1 | 1 |
| 10 | 11 | 2 | 3 |
| 11 | 10 | 3 | 2 |

FIG. 6

| Gray Decoding: | | | |
|---|---|---|---|
| CELL In | CELL Out | Bit 2x | Bit 2x+1 |
| 0 | 0 | 0 | 0 |
| 1 | 1 | 1 | 0 |
| 2 | 3 | 1 | 1 |
| 3 | 2 | 0 | 1 |

FIG. 7

| Input to Phase Angle VS Reference Table: | | | |
|---|---|---|---|
| Bit Pair Input | CELL Input | Angle (Binary) | Angle (Degrees) |
| 00 | 0 | 0 | 0 |
| 01 | 1 | 64 | 90 |
| 10 | 2 | 128 | 180 |
| 11 | 3 | 192 | 270 |

FIG. 9

| PQ Data Format: | | |
|---|---|---|
| Byte # | Bit # | Definition |
| High Byte | D15 | 0 |
| | D14 | 0 |
| | D13 | 0 |
| | D12 | 0 |
| | D11 | P sign |
| | D10 | P mag msb |
| | D9 | ... |
| | D8 | ... |
| Low Byte | D7 | ... |
| | D6 | P mag lsb |
| | D5 | Q sign |
| | D4 | Q mag msb |
| | D3 | ... |
| | D2 | ... |
| | D1 | ... |
| | D0 | Q mag lsb |

DATA COMMUNICATION OVER POWER LINES

BACKGROUND OF THE INVENTION

1. Field of the Invention

The present invention relates generally to data communication by way of power lines and more particularly to a system for transmitting and receiving high frequency data signals over a low frequency (60 Hz) utility power line.

2. Prior Art

Power line communication systems have been in use for quite some time providing telephone service in remote rural areas or for remote control of appliances, lights, security alarms, garage door openers, electrical outlets, etc. Power line communication systems are affected in general by three major factors, namely, noise, isolation and complexity. Noise is perhaps the biggest problem as utility power lines carry a great deal of electrical noise which affects the system readability of the high frequency carrier signal superimposed on the low frequency (60 Hz) alternating current (AC) power line. To overcome this problem multiple transmissions of the same block of data are usually required to assure that the receiving device responds correctly to the transmitted data. Furthermore, once a transmission signal is placed on the power line, it appears everywhere on the power line distribution system. To prevent this from happening, isolation devices maybe inserted in series with the power distribution system to carry the full current thereof. Such isolation devices are usually costly to purchase and maintain in the long run. In some cases, a great deal of cross-talk is present between various units or buildings connected on the same power line distribution system. To overcome these problems, power line transmitters and/or receivers usually include complex circuitry which raises manufacturing costs and is usually limited to a few specific applications, i.e. it is not readily adaptable to a wide variety of operational conditions.

Power line communication also offers certain advantages to the power user. For example, by utilizing existing power lines as means for data communication between transmitters and receivers within a building, such systems may be installed on site without the need for additional wiring. Moreover, utilizing power lines for communication also provides a greater physical range of control than may be available via known infrared, ultrasonic or RF control systems.

The conventional power line communication scheme involves a receiver connected between the power line and each device to be controlled thereof and a plurality of transmitters connected to the power line for transmitting data signals to the receivers. Data is transmitted in a synchronized fashion at a modulation frequency generally much greater than the 60 Hz AC power line frequency, e.g., 120 kHz, with each transmission word usually including a start code, an appliance or house code and an operation code whereby each code is composed of a predetermined number of data bits. Various power line data communication protocols are in use today, however, none is capable in conjunction with its associated hardware of providing an inexpensive and effective power line communication solution to the average user which may be implemented in a wide variety of operational conditions.

Therefore, the need arises for an improved power line communication system which does not use isolation devices, is capable of transmitting and receiving high frequency data signals from the power line accurately and efficiently and is easily adaptable to a wide variety of operational conditions. Such a communication system should preferably use an improved data communication protocol which can effectively handle data transmissions in any kind of environment.

SUMMARY OF THE INVENTION

The present invention meets the above needs and is directed to a power line communication system, comprising a processor for encoding digital data into phase packets; a sine wave approximator operatively coupled to the processor for generating a high frequency sine wave-shaped communication signal on command by the processor; means for superimposing the generated high frequency sine wave-shaped communication signal on a low frequency alternating current (AC) power line; means for decoupling the superimposed high frequency sine wave-shaped communication signal from the low frequency AC power line; means for filtering the decoupled high frequency sine wave-shaped communication signal; means for digitizing the filtered decoupled high frequency sine wave-shaped communication signal; and a demodulator operatively coupled to the processor for receiving and demodulating the digitized high frequency communication signal, the demodulated high frequency communication signal sent to the processor for communication data recognition.

In accordance with one aspect of the present invention, the processor includes means for error detection of the sent demodulated high frequency communication signal.

In accordance with another aspect of the present invention, the superimposing means includes a transconductance amplifier operatively coupled to the sine wave approximator for receiving and superimposing the generated high frequency sine wave-shaped communication signal on the low frequency AC power line and drawing current through a bridge rectifier, the bridge rectifier operatively coupled to the low frequency AC power line.

In accordance with yet another aspect of the present invention, the decoupling means includes a high-pass filter operatively coupled to the bridge rectifier for receiving and decoupling the superimposed high frequency sine wave-shaped communication signal from the low frequency AC power line.

In accordance with still another aspect of the present invention, the filtering means includes a first band-pass filter operatively coupled to the high-pass filter for receiving and filtering the decoupled high frequency sine wave-shaped communication signal. The filtering means further includes a second band-pass filter operatively coupled to the first band-pass filter for receiving and filtering the filtered high frequency sine wave-shaped communication signal from the first band-pass filter.

In accordance with a further aspect of the present invention, the digitizing means includes a digitizing comparator operatively coupled to the second band-pass filter for digitizing the filtered decoupled high frequency sine wave-shaped communication signal, the digitized signal being a 1-bit in phase signal or a 1-bit 90° out of phase signal.

In accordance with a still further aspect of the present invention, the demodulator comprises a D-flip flop and a quadrature generator for receiving the 1-bit in phase and the 1-bit 90° out of phase signals from the digitizing comparator, the quadrature generator generating a first in phase output signal and a second 90° out of phase output signal. The demodulator further comprises first and second digital integrators for detecting the first in phase output signal and the second 90° out of phase output signal.

In accordance with a different aspect of the present invention, the power line communication system comprises a frame generator operatively coupled to the first and second digital integrators for generating a series of cell frame interrupt signals for the processor.

In accordance with a still different aspect of the present invention, the power line communication system further comprises a data compressor operatively coupled to the first and second digital integrators for compressing received data signals.

In accordance with an alternative aspect of the present invention, the power line communication system further comprises an application-specific integrated circuit (ASIC) coupled to the processor by way of a data bus. The ASIC includes a field-programmable gate array (FPGA), the FPGA including the demodulator and the sine wave approximator.

The present invention is also directed to a power line communication method, comprising the steps of:

(a) generating a sequence of fixed length and fixed frequency data cells, each data cell of one of four phases 0°, 90°, 180° or 270° relative to the phase of a preceding transmitted cell, the first cell in the sequence designated zero-phase reference cell;

(b) transmitting the sequence of fixed length and fixed frequency data cells over the AC power line, the transmitted cells synchronized by zero voltage crossings on the AC power line and distributed over the half cycle of the AC power line, the zero-phase reference cell carrying no data;

(c) receiving the transmitted data cells off the AC power line, each transmitted data cell evaluated for phase shift relative to a preceding transmitted data cell;

(d) detecting the signal phase of the received data cells;

(e) extracting the phase angle from the detected data cells;

(f) recovering the data from the extracted phase angle information; and (g) checking the recovered data for data integrity errors.

These and other aspects of the present invention will become apparent from a review of the accompanying drawings and the following detailed description of the preferred embodiments of the present invention.

DETAILED DESCRIPTION OF THE PREFERRED EMBODIMENTS

Hereinafter, some preferred embodiments of the present invention will be described in detail with reference to the related drawings of FIGS. 1–10. Additional embodiments, features and/or advantages of the invention will become apparent from the ensuing description or may be learned by the practice of the invention.

In the figures, the drawings are not to scale and reference numerals indicate the various features of the invention, like numerals referring to like features throughout both the drawings and the description.

The following description includes the best mode presently contemplated for carrying out the invention. This description is not to be taken in a limiting sense, but is made merely for the purpose of describing the general principles of the invention.

The present invention is directed to a power line communication system, generally referred to by reference numeral 20 (FIG. 1), which can be used for transmitting and receiving data by way of superimposing a high frequency data carrier signal on the low frequency (60 Hz) AC power line signal. Power line communication system 20 represents an integration of hardware, embedded firmware and programming software designed to allow effective transmission and receiving of data signals over the power lines which may be utilized for a wide variety of applications such as, for example, remote control of various household appliances, lighting systems, security alarm systems, garage door openers, electrical outlets, personal computers, printers; telephone communications; home/office networking and the like.

Figure 1A:
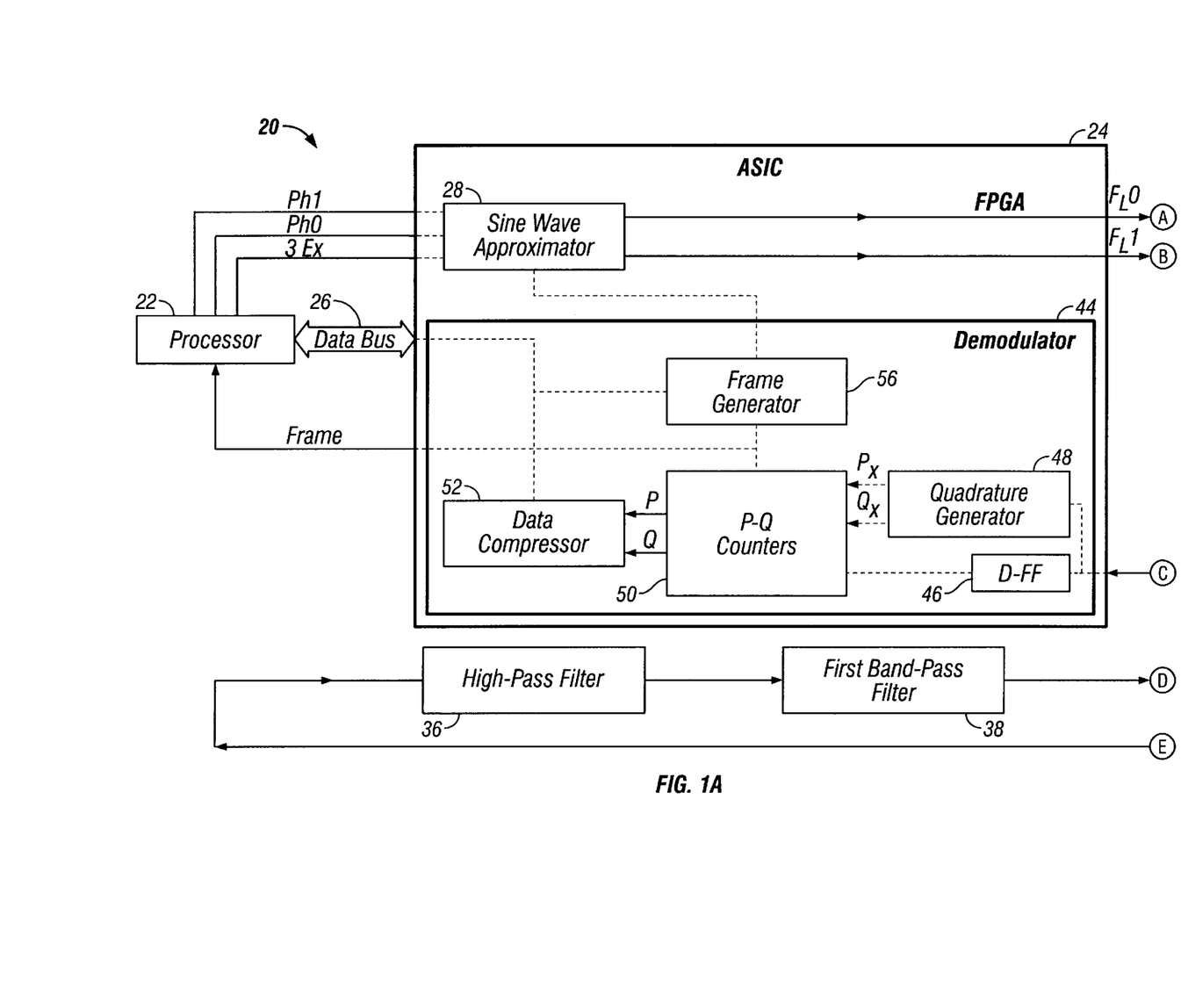
FIG. 1 is a block diagram of a power line communication system in accordance with the present invention.
Figure 1B:
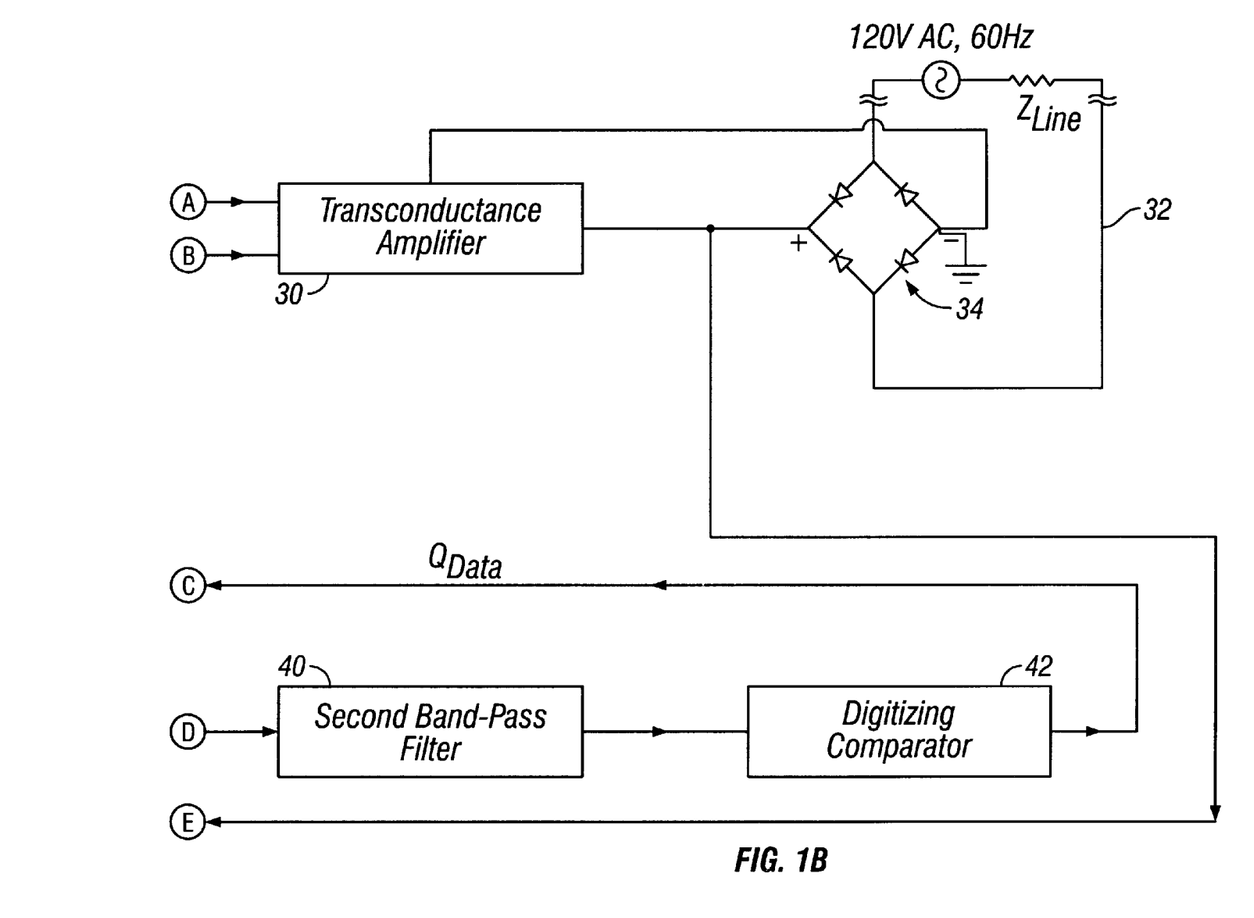

As illustrated in FIG. 1, power line communication system 20 comprises an inexpensive processor 22 having embedded firmware and electrically connected to an application-specific integrated circuit (ASIC) 24 including a field programmable gate array (FPGA) via a 2-bit wide data bus 26. FPGAs implement combinatorial logic in small look-up tables with each table either feeding the D-input of a flip-flop or driving other logic or I/O. An FPGA contains a matrix of identical logic blocks with metal lines of various length running horizontally and vertically in between the logic blocks selectively interconnecting the logic blocks or connecting the logic blocks to the I/O blocks. A field programmable gate array and processor suitable for practicing the present invention may be purchased, for example, from Xilinx, Inc. of San Jose, Calif., and from Philips Signetics of Eindhoven, The Netherlands, respectively.

ASIC 24 comprises a digital sine wave approximator 28 driven by a 115 kHz clock (not shown) in the FPGA with the sine wave approximator 28 operatively coupled between processor 22 and a transconductance amplifier 30 which draws current from a 120 V, 60 Hz alternating current (AC) power line 32 through a full-wave bridge rectifier 34 as shown in FIG. 1. AC power line 32 has impedance $Z_{LINE}$ which corresponds to the impedance of the 60 Hz wiring of the site in which power line communication system 20 is installed. Bridge rectifier 34 draws power from AC power line 32 and produces a full-wave rectified d.c. output voltage signal across its positive and negative terminals which is applied to transconductance amplifier 30 (FIG. 1). Under the direction of processor 22, sine wave approximator 28 generates a digital AC-shaped voltage waveform (at a much higher frequency than the 60 Hz power line) which after conversion to analog form is fed to transconductance amplifier 30. Transconductance amplifier 30 produces in response a current output signal which contains a high frequency AC communication (carrier) component superimposed on the low frequency (60 Hz) d.c. power line component. The resulting signal is then passed through a high-pass filter 36 for decoupling the low frequency d.c. component. The output from high-pass filter 36 is fed to a first band-pass filter 38 and then to a second band-pass filter 40 which feeds into a digitizing comparator 42 (FIG. 1). ASIC 24 also includes a demodulator 44 which is operatively coupled between digitizing comparator 42 and processor 22 as shown in FIG. 1.

Figure 2:
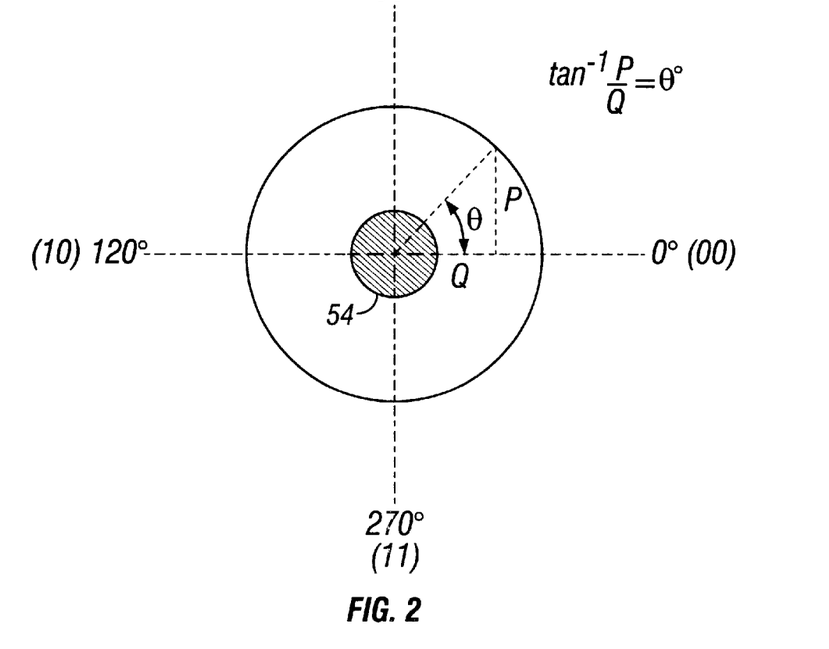
FIG. 2 is a unit circle diagram for use with a quadrature phase generation and extraction technique in accordance with the present invention.
Figure 3:
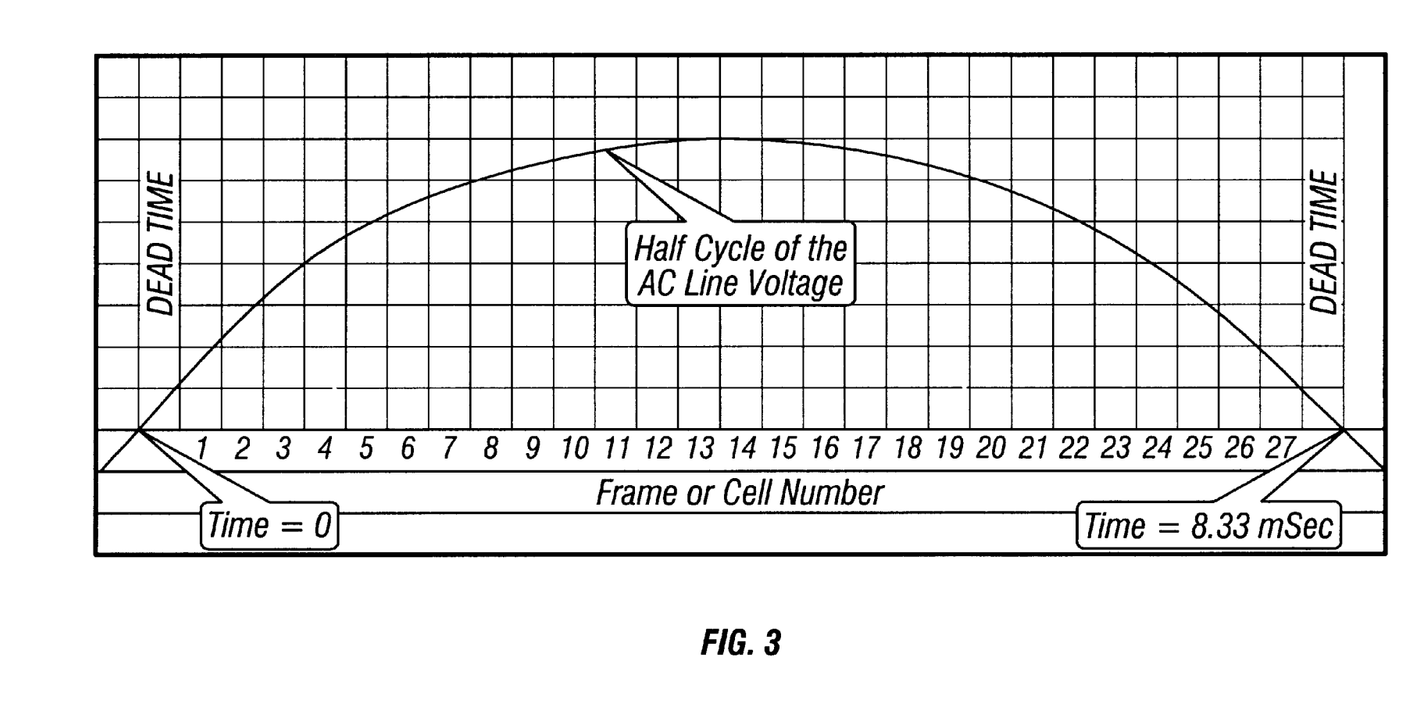
FIG. 3 is a graph of a half cycle of the 60 Hz power line voltage with 27 data cell locations shown relative to two zero voltage crossing points of the power line voltage in accordance with the present invention.

In accordance with a preferred embodiment of the present invention, data transmission over AC power line 32 includes sending a sequence of fixed length and fixed frequency cells wherein each transmitted cell is of one of four phases 0°, 90°, 180° or 270° (FIG. 2) relative to the phase of a preceding transmitted cell with the first transmitted cell designated as a zero-phase reference cell. As shown in FIG. 3, the data transmissions are synchronized by the voltage zero crossings of AC power line 32 and each transmission consists of 27 cells evenly distributed over the AC voltage line half cycle. Since data transmissions are synchronized with AC line voltage zero crossings, power line communication system 20 may be typically used in single phase and two-phase power distribution systems. Power line communication system 20 may be modified for use across phase in three-phase systems as long as such modification does not depart from the intended purpose of the present invention.

As further shown in FIG. 3, a so-called "dead time" (i.e. no transmission) of about one cell length may be used at the beginning and end of each half cycle on AC power line 32 if $Z_{LINE}$ cannot support the required transmission current sink levels at low line voltages. The first or reference cell is transmitted from processor 22 (which sends two bits at a time to ASIC 24 via data bus 26) at zero phase according to the processor internal transmitter clock. Subsequent cells are transmitted with a phase shift of 0°-bits 00, 90°-bits, 180°-bits 10 or 270°-bits 11 (i.e. phase modulated) to represent one of four phase states associated with a bit pair of transmitted data per cell as shown in FIG. 2. For purposes of describing the present invention, a cell representing one of the 2-bit four phase states may be interchangeably referred to throughout the text as a "phase packet". If multiple integrated transmitting and receiving stations are involved, the clocks in the various stations in general will not be in phase with one another. When the receiving stations receive the reference cell, they would compare the received reference cell with their own internal zero phase transmitter clock and compensate for the offset in evaluating subsequent received cell phases. Each successive cell is evaluated for phase shift relative to the preceding cell to minimize skewing toward the last received cell due to modulation frequency differences between the transmitting and receiving stations.

To generate a data transmission, the embedded firmware in processor 22 assembles the data to be sent in a predetermined bit order. One example of a bit order concerning remote control of lights in a residential setting is shown in a table format in FIG. 5. The table in FIG. 5 preferably has three columns—one column for bit number, a second column for cell (or phase packet) number and a third column for information (or data). The first two bits (bit 0 and bit 1—FIG. 5) contain no data and correspond to reference cell 0. The relevant data is 26 bits long of which 21 bits represent system data and 5 bits are checksum for the 21 bits system data with each successive pair of bits corresponding to a particular cell (phase packet) such as cell 1, cell 2, cell 3, etc. The 21 bits of relevant data is also designated Data 1 which together with Checksum 1 comprise Word 1 in FIG. 5.

Figure 5A:
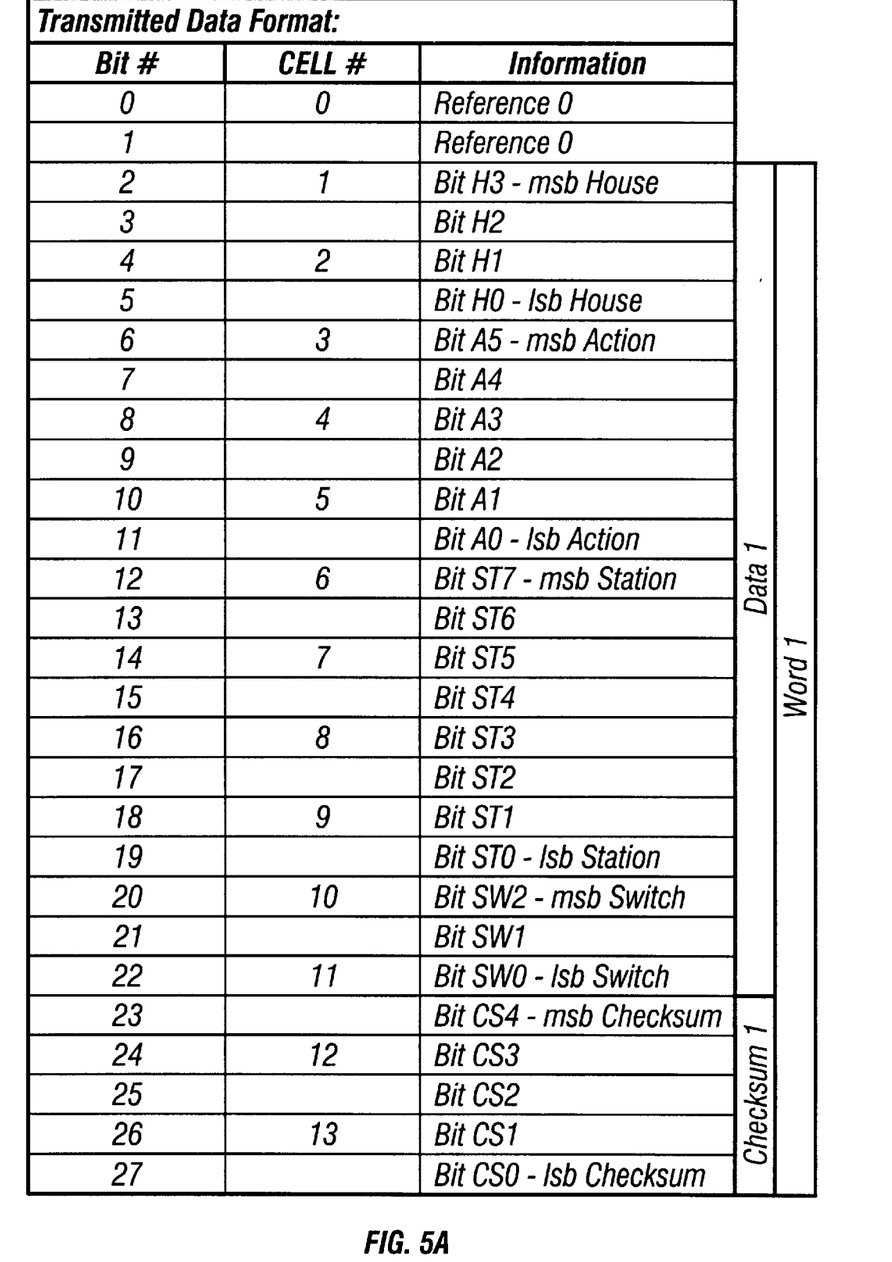
FIG. 5 is a table illustrating the assembly of transmission data in accordance with the present invention.
Figure 5B:
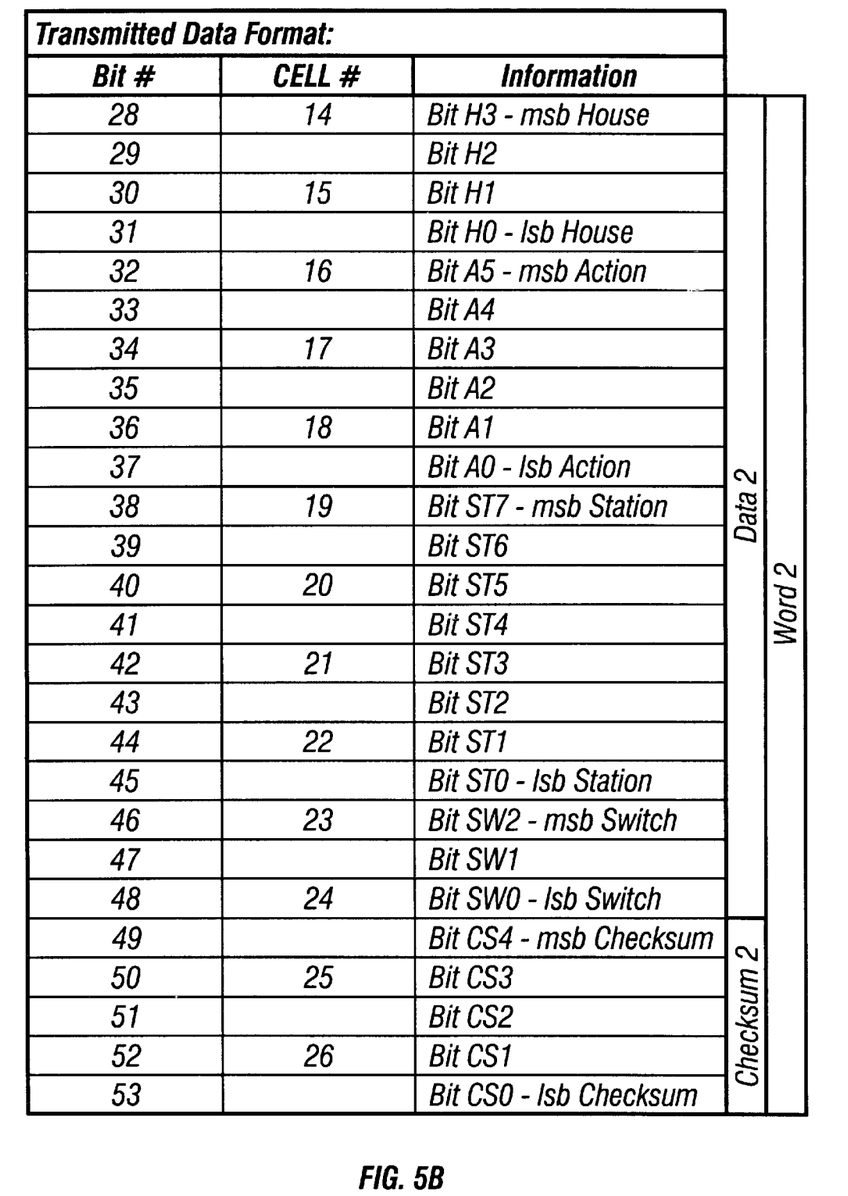
Figure 6:
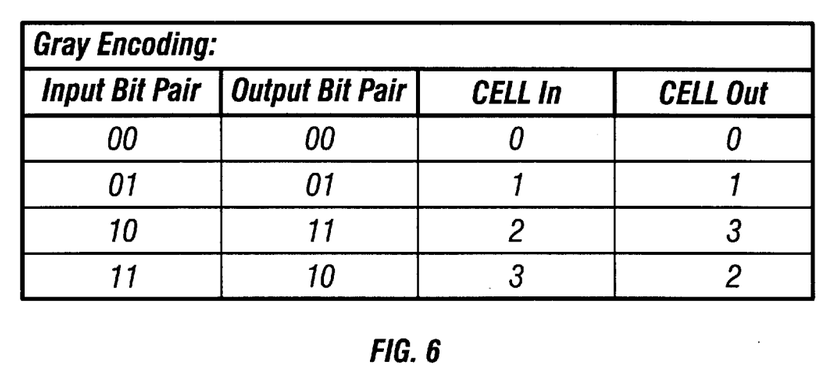
FIG. 6 is a table illustrating the encoding of data in accordance with the present invention.

In accordance with the best mode for practicing the present invention, Word 1 is preferably repeated for redundancy and error detection—see Word 2 (in FIG. 5) which is identical to Word 1. As also shown in FIG. 5, the reference cell (cell 0) is not repeated. The entire communication string, therefore, includes 27 cells (composed of cell 1 through cell 26 plus cell 0—see FIGS. 5, 3). Cell 0 is commanded by a "00" phase generator input (to be discussed hereinbelow) and corresponds to 0°. Once the cells to be transmitted have been defined, the cells are Gray encoded as shown in table format in FIG. 6. In general, a Gray code (after Frank Gray, U.S. Pat. No. 2,632,058) represents each number in the sequence of integers [0 . . . 2^N−1] as a binary string of length N in an order such that adjacent integers have Gray code representations that differ in only one bit position. Gray encoding is used to reduce the number of bits that could be in error if there is a misread with the error probability decreasing with distance (in degrees) from the intended transmission.

Figure 4:
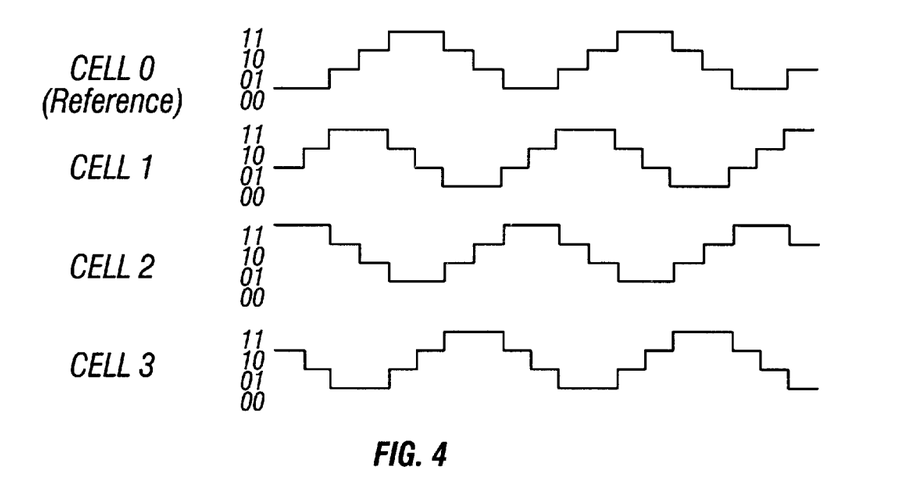
FIG. 4 is a waveform diagram of the output from a sine wave approximator for use in accordance with the present invention.

At each zero crossing of AC power line 32, the FPGA sends a frame interrupt signal (FIG. 1) to processor 22 for operational and communication synchronization. Processor 22 sends a 2-bit command to sine wave approximator 28 via phase command lines Ph1 and Ph0 and line $TE_n$ (transmit enable) to initiate a communication sequence and places the first 2-bit data phase packet (cell) on data bus 26 (FIG. 1). The FPGA starts the cell frame generator 56 and sine wave generator 28 automatically begins to generate a reference cell sine wave at the transmitter frequency and at 0-phase shift. At the end of the first (reference) cell, the FPGA reads the next cell (phase packet) input from data bus 26 and initiates a cell frame interrupt via cell frame generator 56 to processor 22 (FIG. 1). The sine wave approximator then changes the phase of the generated sine output to match the phase of the new cell (phase packet) (FIG. 9) and processor 22 sets up the next cell on data bus 26. The sequence continues under the timing direction of the cell frame generator 56 until all 27 cells have been transmitted. The sequence ends approximately one frame of time before the end of the half cycle of AC power line 32. Digital output from sine wave approximator 28 is a 2-bit representation of a sine wave having eight states repeating for one full cycle at the transmitter frequency. An example of such output is shown in FIG. 4.

In accordance with another preferred embodiment of the present invention, the 2-bit sine wave outputs are converted to analog form using a simple R2R resistor ladder (not shown). The quantized output is then filtered through a conventional passive two-pole filter (not shown) to produce a low distortion high-frequency (115 kHz or 131 kHz, depending on the needs of the user) sine voltage waveform which is fed into transconductance amplifier 30 via $F_O1$ and $F_O0$ lines (FIG. 1). Transconductance amplifier 30 draws current from AC power line 32 through bridge rectifier 34 superimposing the high frequency data signal on the 60 Hz AC power line as shown in FIG. 1. Bridge rectifier 34 allows high frequency data transmission on both (positive and negative) half cycles of AC power line 32 with a simple single ended amplifier (not shown). The resulting output is fed into a high-pass filter 36 (centered at 121 kHz) which attenuates the 60 Hz signal by about 60 dB or 1000 to 1. Further details on the operation and/or design of transconductance amplifier 30, bridge rectifier 34 and/or high-pass filter 36 may be found in U.S. patent application, Ser. No. 09/666,433, filed Sep. 21, 2000 having identical inventors and entitled "Power Line Communication Circuit" and assigned to common assignee, now U.S. Pat. No. 6,377,163B1, the contents of which is incorporated herein by reference.

Since the high-frequency carrier signal may be relatively small by the time it reaches a receiver, further filtering is needed to attenuate further the low frequency (60 Hz) power line component. Therefore, the output from high-pass filter 36 is fed to a conventional first band-pass filter 38 (FIG. 1) designed to minimize the undesirable effects of transport lag and transient induced ringing. First band-pass filter 38 is provided with an analog switch (not shown) for changing the center frequency (121 kHz) from 115 kHz to 131 kHz as desired by the user. The output from first band-pass filter 38 is fed into a conventional second band-pass filter 40 (FIG. 1) with both filters centered at 121 kHz which is the geometric mean between the two transmitter frequencies –115 kHz and 131 kHz. The output from second band-pass filter 40, which contains predominantly the carrier frequency at levels ranging from a few millivolts to several volts depending on the site wiring and the number of devices plugged onto the system, is fed into a conventional digitizing comparator 42 (FIG. 1) which compares the filter input signal to a reference signal (of about 2 mV) to create a single bit logic state representing a positive (0°–180°) or negative (180°–360°) swing of the carrier frequency. The small offset in comparator 42 is used to minimize oscillations in comparator output in the absence of a decodable signal. The single-bit output $Q_{DATA}$ (FIG. 1) from comparator 42 is thus "1" or "0", where "1" corresponds to the detected signal being on the positive half-cycle of AC power line 32 and "0" corresponds to the detected signal being on the negative half-cycle of AC power line 32. This "in phase/out of phase" signal is then fed to demodulator 44 (FIG. 1) to be compared with the receiver (demodulator 44) internal carrier reference. Thus, a critical task in receiving the data transmission is to determine the phase of the incoming signal relative to the receiver's own carrier frequency clock.

If the receiver setup was analog, the exact phase and magnitude component of a signal at a reference frequency may be found by (a) integrating the detected signal multiplied by the sine of the reference signal for an integer number of cycles with the result designated P; (b) integrating the detected signal multiplied by the cosine of the reference signal for the same integer number of cycles with the result designated Q; (c) the magnitude of the detected signal=$[P^2+Q^2]^{0.5}$; and (d) the phase (angle) of the detected signal=$\tan^{-1}P/Q$.

As further depicted in FIG. 1, $Q_{DATA}$ is fed to a D flip flop (D-FF) 46 and a quadrature generator 48, i.e. exclusive OR'd with the quadrature clock. Quadrature generator 48 generates two 115 kHz output signals ($P_k$, $Q_k$) which are 90° out of phase (FIG. 1). The two quadrature outputs ($P_k$, $Q_k$) are then fed to P and Q counters 50 (FIG. 1) which function as digital integrators and detect the "in phase" and "90° out of phase" components of the incoming signal, respectively. The P integrator uses an internal reference signal that is in phase with its internal 115 kHz clock, while the Q integrator uses an internal reference signal that is 90° out of phase with its internal 115 kHz clock. The "in phase" P integrator increases its count by one for each sample period in which the binary value of its reference clock matches the 1-bit input incoming signal and counts down one each time there is a mismatch. The Q integrator counts the same way except that its internal reference is shifted in time by 90° to approximate the analog cosine integration. The sampling rate may be about 5 MHz. For example, if the detected signal is in phase with the reference of the P integrator, the integrated result at the end of a cell will be about 1700. If the detected signal is 180° out of phase with the reference of the P integrator, the integrated result at the end of a cell will be about –1700. If the detected signal is 90° out of phase with the reference signal of the P integrator, the integrated result at the end of a cell will be about 0 since in the first quarter cycle, the count will be up, in the second quarter cycle the count will be down, in the third quarter cycle the count will be up and in the fourth quarter cycle the count will be down, i.e. the net sum of the counts will be zero.

Since the phase must be detected for each cell, both integrators are continuously free running at the same frequency (±0.01% or the like) being synchronized by every AC line zero voltage crossing and are reset on each of the 27 frames following the zero voltage crossing—at the beginning of each cell initially for decoding the reference cell and then once for each phase packet or cell of transmitted data. As in the transmitting stage, all cell timing in the receiving stage is controlled within the FPGA and is synchronized by zero crossings of AC power line 32. The FPGA sends a cell frame interrupt signal (FIG. 1) via frame generator 56 to processor 22 at the end of each cell to instruct processor 22 to acquire the P and Q counts (integrator results).

For example, if the first cell received by a receiver has a 120° phase, it will perceive this cell as a reference cell—bits 00—first quadrant (i.e. no data) and if the next received cell is at 125°, it will assign to it bits 00 as the angles are too close, i.e. reside in the same quadrant. If on the other hand, the next received cell is at 210°, it will assign bits 01 to it, i.e., second quadrant (FIG. 2) as this angle is offset by about 90° from 120°. If now a third cell is received at 210°, it will assign bits 00 relative to the preceding cell as the two angles are identical. Thus, the receiver each time resets its reference relative to the preceding received cell to minimize phase angle error propagation.

In accordance with yet another preferred embodiment of the present invention, error detection may be done at the gate array level and involves evaluating the P and Q counts at the end of each frame. Specifically, if the P count ≤±32 (about 5% of full scale) and if the Q count ≤±32 (noise threshold) for three cells in a row, the FPGA will cease sending cell frame interrupts to processor 22 for the remainder of the half cycle. If processor 22 does not receive all 27 frame interrupts in a half cycle, processor 22 will know that data was either not present or not decodable due to excessive noise and will take no further action, i.e. it will proceed to the next half cycle. The above noise threshold (32) is shown as a cross-hatched circular area 54 in FIG. 2. A person skilled in the art would readily recognize that the noise threshold may be altered according to the needs of the user.

The actual phase is found in processor 22 by using a phase angle look-up table (not shown) that is indexed by P and Q integrator values with the phase angle given by $\tan^{-1}P/Q$. The look-up table computes $\tan^{-1}P/Q$.in a single action greatly reducing the computing load on processor 22. Since the look-up table must have an angle value for every possible combination of P and Q integrator values, the table may have to include about 10 million entries. To reduce the size of the look-up table so as to improve processor throughput, the present invention uses a signal level scaling scheme which may include scaling the P and Q integrator values in length to 1 sign bit and 5 magnitude bits each (described hereinbelow) in which case the table length would be about 4 kbytes. The loss of resolution inherent in this signal level scaling example is estimated to be generally insignificant to the overall system operation.

Another time-saving step involves scaling the phase angles from an actual range of 0°–359° to a scaled down range of 0°–255°. This type of scaling keeps the phase angle data 1 byte wide per table entry thereby cutting the look-up table length in half. Also, expressing the phase angle over the fill 8-bit binary range allows the decoding and encoding routines in processor 22 to be done with simple additions, subtractions and bit manipulations. An example of scaled down phase angles is shown in table format in FIG. 9, i.e. binary (or scaled down) angle 0 corresponds to 0°, binary (or scaled down) angle 64 corresponds to 90°, binary (or scaled down) angle 128 corresponds to 180°, etc.

Figure 8:
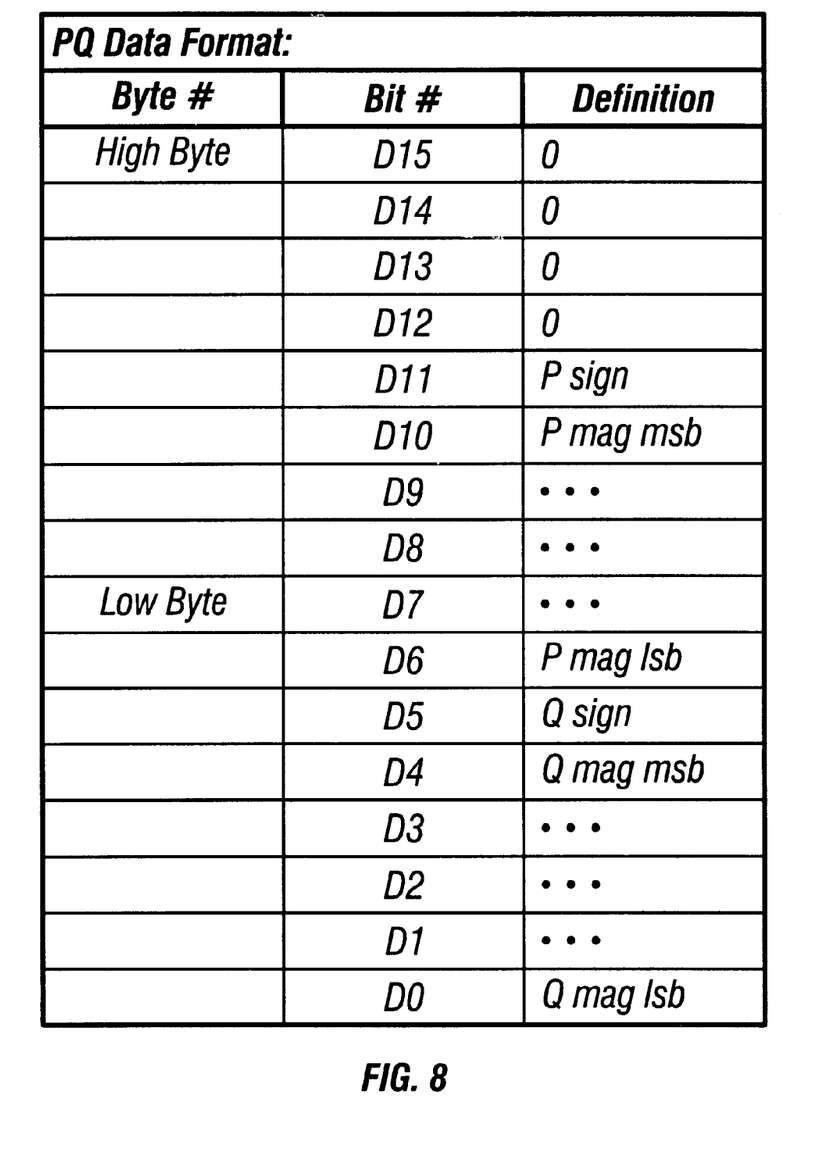
FIG. 8 shows the structure of the P-Q count between two digital integrators and a processor in tabular form in accordance with the present invention.
Figure 9:
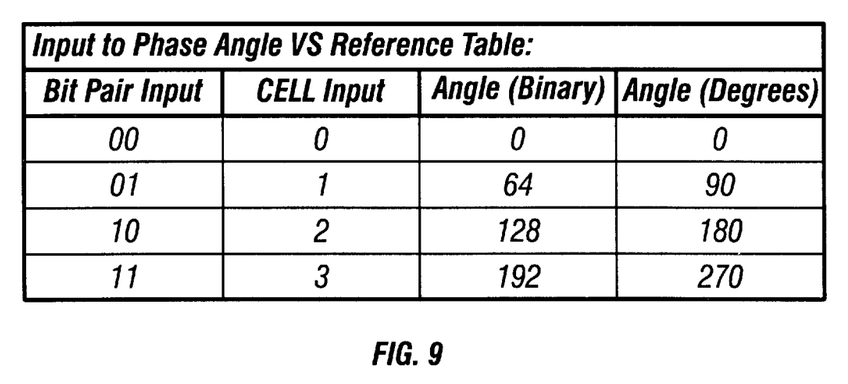
FIG. 9 shows a definition of angle commands from the processor in tabular form in accordance with the present invention.

Yet another time-saving step involves formatting the PQ data in 12-bit words as shown in table format in FIG. 8. The 12-bit word is assembled by data compressor 52 and is read by processor 22 in 2 bytes. The look-up table is thus organized in one dimension, meaning that a 12-bit word containing P and Q integrator data directly results in a phase angle output. To compress 12 bits of integrator count into 6 bits, data compressor 52 examines the magnitudes of both the P and Q integrator values. Excluding the sign bit, if either magnitude contains a "1" in any of the three most significant bits (bit 11, bit 10 or bit 9), the FPGA will use the five most significant bits of both the P and Q counts (bit 11, bit 10, bit 9, bit 8 and bit 7) in assembling the 12-bit word for looking up the phase angle. If neither count has "1's" in the three most significant bits, the FPGA uses the 4th through the 8th most significant bits (bit 8, bit 7, bit 6, bit 5 and bit 4).

Figure 7:
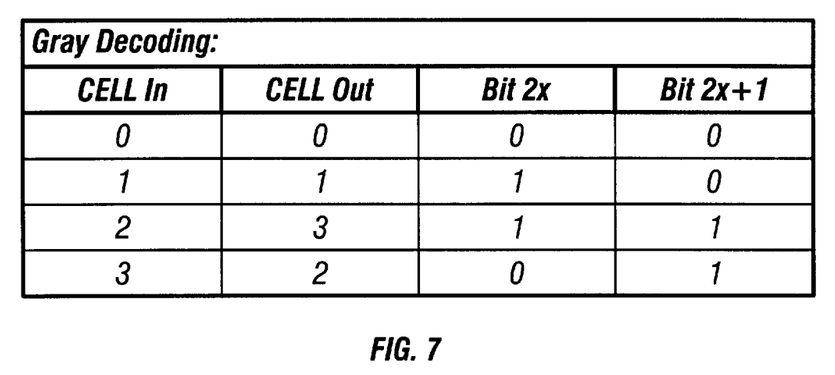
FIG. 7 is a table illustrating the decoding of data in accordance with the present invention.

To unwind the data from the phase information, the 26 transmitted cells or phase packets are extracted from the phase angle data by reversing the process described hereinabove for generating the cells (phase packets). The first cell is found by taking the difference between the first cell angle and the second cell angle, then adding 32. The first cell is the two most significant bits of the byte-wide result. The second cell is found similarly except that the difference between the second cell angle and the third cell angle is used. The last 26th cell is found by using the difference between the 26th cell angle and the 27th cell angle. The next step is unwinding the Gray encoding and switching the phase packets (cells) back to bits. FIG. 7 shows a Gray decoding table which provides the cell (phase packet) input to bits output relationship. By placing the phase packets (bits) back in the order shown in FIG. 5, the transmitted data has been fully reconstructed.

To minimize missed communication signals and erroneously interpreted noise, power line communication system 20 relies on redundancy of transmitted data and data integrity checksums (FIG. 5). Each half cycle of communication contains two copies of data and its checksum as shown in FIG. 5. Furthermore, it is anticipated that transmitting stations will always transmit the same system command twice on consecutive half cycles of the AC power line. This type of redundancy gives each receiving station a second chance to receive the transmission. The system architecture should be such that a receiving station responds to the first correctly decoded command and ignores the second command if the second command is a copy of the first command.

Figure 10:
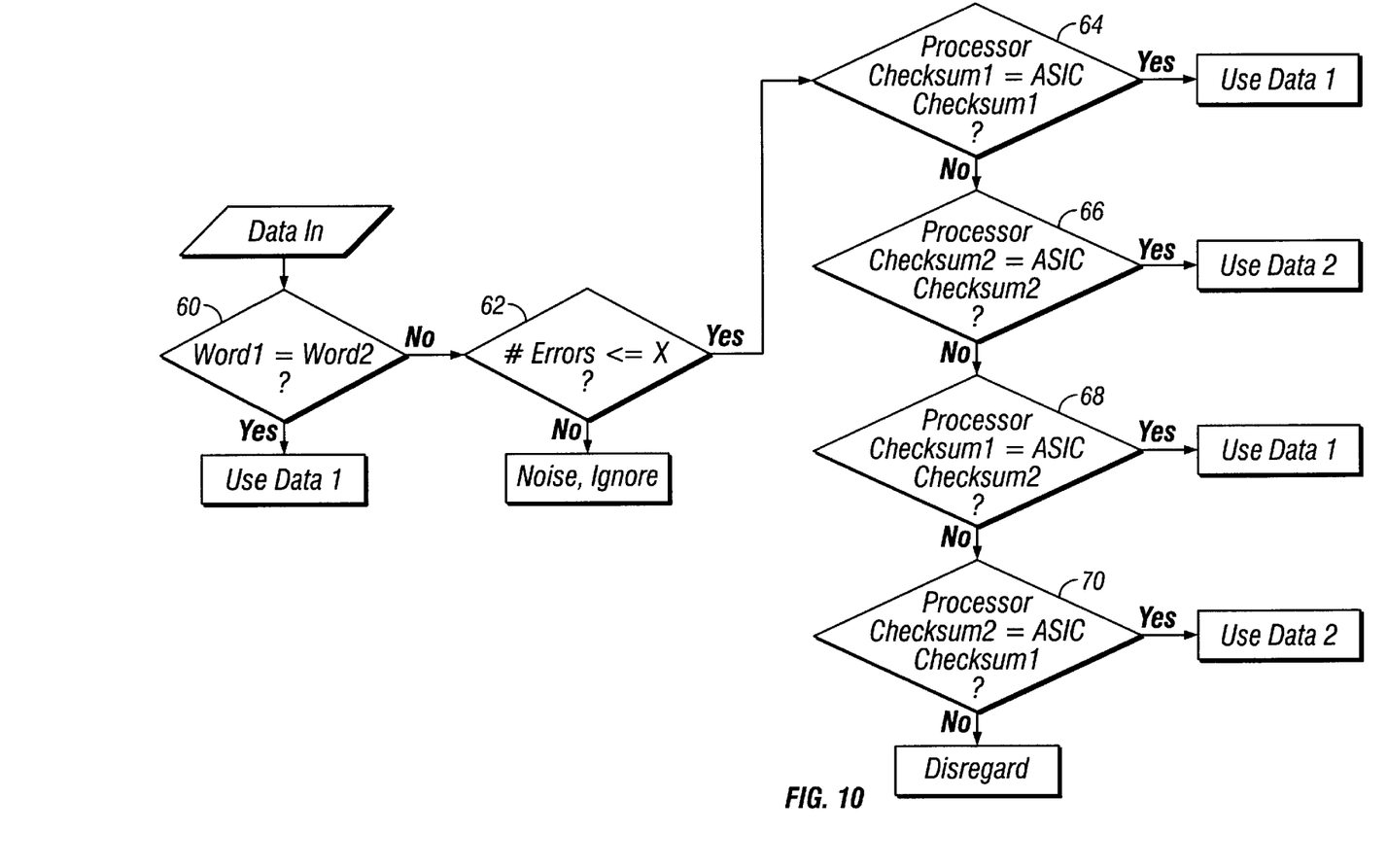
FIG. 10 is an error detection flow chart for use in accordance with the present invention.

Another level of error detection is performed at the receiver (processor) end in accordance with a further preferred embodiment of the present invention (see flow chart in FIG. 10). Specifically, the first step in the routine involves processor 22 checking if Word 1=Word2? (see step 60 in FIG. 10, see also FIG. 5). If the answer is affirmative, processor 22 may use Data1. If the data has been in a noisy environment and there has been some data corruption, then the answer is negative and processor 22 tries to determine (step 62 in FIG. 10) if the number of errors (i.e., the number of bits that are different between Word1 and Word2) is less than a certain pre-determined programmable error threshold value (which, if applied to the above lighting control example may be set at "4"). If the answer is negative, processor 22 will ignore the data signal. If the answer is affirmative, processor 22 proceeds to the next step 64 (FIG. 10). Since processor 22 computes its own checksum on the transmitted data, step 64 involves processor 22 checking to see if its own checksum1 matches the transmitted ASIC checksum 1. If there is a match, datal may be used by processor 22. If there is no match, processor 22 proceeds to the next step 66 which checks if the processor checksum2 matches the transmitted ASIC checksum 2. If there is a match, data2 may be used by processor 22. If there is no match, processor 22 proceeds to the next step 68 which cross-checks if the processor checksum1 matches the transmitted ASIC checksum 2. If there is a match, datal may be used by processor 22. If there is no match, processor 22 proceeds to the next step 70 which cross-checks if the processor checksum2 matches the transmitted ASIC checksum 1. If there is a match, data2 may be used by processor 22. If there is no match, processor 22 decides that there is too much corruption in the transmitted data and disregards the transmission.

Other methods of error detection/correction may be used such as Viterbi encoding and decoding. A person skilled in the art may use a communication timing scheme that allows, for example, point-to-point directed communication with handshaking or acknowledgment provided such a scheme does not depart from the intended purpose and scope of the present invention.

It should be appreciated by a person skilled in the art that other components and/or configurations may be utilized in the above-described embodiments, provided that such components and/or configurations do not depart from the intended purpose and scope of the present invention.

While the present invention has been described in detail with regards to the preferred embodiments, it should be appreciated that various modifications and variations may be made in the present invention without departing from the scope or spirit of the invention. A person skilled in the art would appreciate that from a communication standpoint, any variation on word and error detection/correction, timing and structure is feasible provided such variations do not depart from the intended purpose and scope of the present invention. From a hardware standpoint, possible variations of the above setup may include selecting a different type processor and FPGA. In fact the FPGA may be substituted with a fixed digital design or a custom ASIC. Also, it may be possible to integrate the processor, the gate array digital logic and the memory necessary to accomplish the above-described functionality on a single IC chip.

In this regard it is important to note that practicing the invention is not limited to the applications described hereinabove. Many other applications and/or alterations may be utilized provided that they do not depart from the intended purpose of the present invention.

It should be appreciated by a person skilled in the art that features illustrated or described as part of one embodiment can be used in another embodiment to provide yet another embodiment such that the features are not limited to the specific embodiments described above. Thus, it is intended that the present invention cover such modifications, embodiments and variations as long as they come within the scope of the appended claims and their equivalents.

What is claimed is:

1. A power line communication system comprising:
(a) a processor for encoding digital data into phase packets;
(b) a Gray encoder coupled to said processor for Gray encoding said digital data;
(c) a sine wave approximator operatively coupled to said processor for generating a high frequency sine wave-shaped communication signal on command by said processor;
(d) mean for superimposing said generated high frequency sine wave-shaped communication signal on a low frequency alternating current (AC) power line;
(e) means for decoupling said superimposed high frequency sine wave-shaped communication signal from said low frequency AC power line;
(f) means for filtering said decoupled high frequency sine wave-shaped communication signal;
(g) means for digitizing said filtered decoupled high frequency sine wave-shaped communication signal;
(h) a demodulator operatively coupled to said processor for receiving and demodulating said digitized high frequency communication signal to extract phase information therefrom, said demodulated high frequency communication signal sent to said processor for communication data recognition; and
(i) a Gray decoder coupled to said demodulator for Gray decoding said digital data signal.

2. The power line communication system of claim 1, wherein said processor includes means for error detection of said sent demodulated high frequency communication signal.

3. The power line communication system of claim 1, wherein said superimposing means includes a transconductance amplifier operatively coupled to said sine wave approximator for receiving and superimposing said generated high frequency sine wave-shaped communication signal on said low frequency AC power line and drawing current through a bridge rectifier, said bridge rectifier operatively coupled to said low frequency AC power line.

4. The power line communication system of claim 3, wherein said decoupling means includes a high-pass filter operatively coupled to said bridge rectifier for receiving and decoupling said superimposed high frequency sine wave-shaped communication signal from said low frequency AC power line.

5. The power line communication system of claim 4, wherein said filtering means includes a first band-pass filter operatively coupled to said high-pass filter for receiving and filtering said decoupled high frequency sine wave-shaped communication signal.

6. The power line communication system of claim 5, wherein said filtering means further includes a second band-pass filter operatively coupled to said first band-pass filter for receiving and filtering said filtered high frequency sine wave-shaped communication signal from said first band-pass filter.

7. The power line communication system of claim 6, wherein said digitizing means includes a digitizing comparator operatively coupled to said second band-pass filter for digitizing said filtered decoupled high frequency sine wave-shaped communication signal, said digitized signal being a 1-bit in phase signal or a 1-bit 90° out of phase signal.

8. The power line communication system of claim 7, wherein said demodulator comprises a D-flip flop and a quadrature generator for receiving said 1-bit in phase and said 1-bit 90° out of phase signals from said digitizing comparator, said quadrature generator generating a first in phase output signal and a second 90° out of phase output signal.

9. The power line communication system of claim 8, wherein said demodulator further comprises first and second digital integrators for detecting said first in phase output signal and said second 90° out of phase output signal.

10. The power line communication system of claim 9, further comprising a frame generator operatively coupled to said first and second digital integrators for generating a series of cell frame interrupt signals to said processor.

11. The power line communication system of claim 9, further comprising a data compressor operatively coupled to said first and second digital integrators for compressing received data signals.

12. The power line communication system of claim 1, further comprising a field-programmable gate array (FPGA) coupled to said processor by way of a data bus, said FPGA being programmed to include said demodulator and said sine wave approximator.

13. A power line communication method, comprising the steps of:
(a) generating a sequence of fixed length and fixed frequency data cells, each data cell of one of four phases 0°, 90°, 180° or 270° relative to the phase of a preceding transmitted cell, the first cell in said sequence designated zero-phase reference cell;
(b) Gray encoding said data cells;
(c) transmitting said sequence of fixed length and fixed frequency data cells over the AC power line, said transmitted cells synchronized by zero voltage crossings on the AC power line and distributed over the half cycle of the AC power line, said zero-phase reference cell carrying no data;
(d) receiving said transmitted data cells off the AC power line, each transmitted data cell evaluated for phase shift relative to a preceding transmitted data cell;
(e) detecting the signal phase of said received data cells;
(f) extracting the phase angle from said detected data cells;
(g) recovering the data from said extracted phase angle information;
(h) Gray decoding said data cells; and
(i) checking said recovered data for data integrity errors.

* * * * *